3,321,419
STABILIZATION OF OIL-MODIFIED URETHANE COATING VEHICLES MADE WITH METHYL GLUCOSIDE

Harry M. Kennedy, Park Forest, Ill., assignor to Corn Products Company, New York, N.Y., a corporation of Delaware
No Drawing. Filed May 7, 1964, Ser. No. 365,795
5 Claims. (Cl. 260—9)

This invention relates to the stabilization against viscosity increase on storage of urethane coating vehicles made with methyl glucoside.

Oil-modified urethane coating vehicles are prepared by the reaction of organic polyisocyanates with products resulting from the alcoholysis of drying oil triglycerides, such as linseed, safflower, soybean or dehydrated castor oil, with polyhydric alcohols. These systems, which contain essentially no unreacted isocyanate groups, cure by the same mechanisms as the conventional alkyd resins; i.e., by absorption of oxygen from the atmosphere and/or polymerization of the double bonds in the fatty acid chains, both of which are promoted by small amounts of added metallic catalyst.

A particular advantage of the oil-modified air-cured urethane coating vehicles over the moisture-cured urethane vehicles which contain free, highly-reactive isocyanate groups, is their greater stability against viscosity increase not only on storage, but also on intermittent use.

In the preparation of these oil-modified vehicles, it is the conventional practice to employ an excess of hydroxyl groups over that theoretically required to react with all the isocyanate groups, or at the end of the preparation add a monohydric alcohol such as methanol, ethanol or butanol, to react with any free isocyanate groups remaining. Both of these procedures not only add to the cost, but also can detract from the performance of the cured films.

The use of methyl glucoside as the polyhydric alcohol for the alcoholysis of drying oil triglycerides in the preparation of oil-modified urethane vehicles, was described by Stanton and Wilson (Ind. Eng. Chem. 51, 1385 (1959)). These workers found that the use of methyl glucoside, instead of glycerol or pentaerythritol, has definite advantages in these systems. The methyl glucoside vehicles prepared were more economical, since higher oil contents and less of the more expensive toluene diisocyanate could be employed in their preparation to achieve hardness values and reverse impact resistances in the cured films which were comparable to those obtained from lower oil and higher toluene diisocyanate content vehicles made with glycerol or pentaerythritol. However, in the preparation of the methyl glucoside vehicles, these authors used about 15 percent excess hydroxyls over that theoretically required to react with all the isocyanate groups in the preparation of approximately a 75 percent linseed oil content vehicle.

I have discovered that when using methyl glucoside as the polyhydric alcohol for the preparation of oil-modified urethane coating vehicles, the excess of hydroxyl groups over that theoretically required to react with all the isocyanate groups can be appreciably reduced from the quantities found necessary in the prior art by the addition of a dibutyltin dilaurate catalyst to the alcoholyzed oil prior to reaction with toluene diisocyanate and that the viscosity of the product is stable when the reaction is conducted at a minimum temperature of 90° C. At temperatures of 130° C. no catalyst is needed to produce viscosity stable vehicles. Not only does my discovery result in viscosity stable vehicles, but it is more economical in that it more efficiently utilizes the expensive toluene diisocyanate and also simplifies the processing technique. My invention is illustrated, but not limited, by the following examples.

Example I 195 grams of linseed oil (alkali refined), 0.2 gram of lithium carbonate and 0.4 gram of anthraquinone were placed in a 500-ml. 4-necked flask equipped with mechanical stirrer, gas inlet tube, thermometer and water condenser. While agitating and passing nitrogen over the linseed oil it was heated to 270° C. as rapidly as possible by means of a hemispherical electric mantle. At this point 24 grams of methyl glucoside (0.495 mole of hydroxyls) were added in four equal portions at 10-minute intervals over a period of 30 minutes, taking care not to allow the temperature to fall below 260° C. After all the methyl glucoside had been added, the temperature was maintained between 257° and 261° C. for 2 hours and then cooled to about 75° C. at which temperature 0.1 gram (0.03–0.04 percent of reactants) of dibutyltin dilaurate (DBTL) was added. When the temperature reached 65° C., 41 grams of toluene diisocyanate (0.471 mole isocyanate, which is a ratio of isocyanate to hydroxyl groups of 1.05 to 1) were introduced to the system slowly over a period of 30 minutes. During this same period 40 grams of toluene were added intermittently to help hold the temperature below 80° C. The temperature was then raised to 95° C. and held for 2 hours, cooled to room temperature, about 1 percent of filter-aid (diatomaceous earth) and 100 grams of additional toluene added with stirring, and then the product was filtered under nitrogen pressure. The vehicle contained 65 percent nonvolatile material (NVM) of which the linseed oil content was 75 percent. It had a Gardner-Holdt viscosity of J (250 cps.) which did not change on storage over a period of 1 year.

Example II

In an apparatus similar to that described in Example I, 195 grams of linseed oil (alkali refined), 0.2 gram of lithium carbonate and 0.4 gram of anthraquinone were rapidly heated to 270° C. while stirring and sparging with nitrogen. Twenty-four grams of methyl glucoside were added to the hot linseed oil in four equal portions at 10-minute intervals making sure the temperature did not fall below 260° C. The mixture was held at about 260° C. for 1.5 hours and then coooled to 65° C. where 0.025 gram (0.009–0.01 percent of reactants) of dibutyltin dilaurate was added, followed by the incorporation of 41 grams of toluene diisocyanate over a half-hour period. Forty grams of toluene were added intermittently during the addition of the diisocyanate in order to hold the temperature below 80° C.

The reaction wixture was then heated to 95° C. and held there for 3 hours, cooled to room temperature and 1 percent filter-aid and 100 grams of toluene added. After filtration under nitrogen pressure, the coating vehicle had a Gardner-Holdt viscosity of F (140 cps.) which did not change on storage for over 1 year. It contained 63 percent NVM and the linseed oil content of the solids was 75 percent. The ratio of hydroxyls to isocyanate groups was 1.05 to 1 (5 percent excess hydroxyls).

Example III

In an apparatus similar to that described in Example I, 184 grams linseed oil (alkali refined), 0.18 gram of lithium carbonate and 0.36 gram of anthraquinone were heated to 270° C. while stirring and sparging with nitrogen. Twenty-three grams of methyl glucoside (0.474 mole of hydroxyls) were added to the linseed oil in four equal portions over a period of 15 minutes. The mixture was held at 260° C. for about 1.5 hours and then cooled to 75° C. where 38 grams of toluene diisocyanate (0.437 mole of isocyanate) were added over about 30 minutes. The urethane reaction temperature was increased to 95° C. and held there for 3 hours where 32 grams of toluene was added after the second hour. The product was then cooled, 1 percent filter-aid and 100 grams of toluene added with agitation and then filtered under pressure. Initial Gardner-Holdt viscosity of this vehicle H (200 cps.) on storage increased to a Gardner-Holdt viscosity of N (340 cps.) over a period of 2 months. This coating vehicle was 65 percent NVM, contained 75 percent linseed oil based on the solids and had a hydroxyl to isocyanate ratio of 1.08 to 1.

*Example IV*

In an apparatus similar to that described in Example I, 184 grams linseed oil (alkali refined), 0.18 gram lithium carbonate and 0.36 gram anthraquinone were heated to 270° C. while stirring and sparging with nitrogen. Twenty-three grams of methyl glucoside (0.474 mole hydroxyls were added in four equal portions at 5-minute intervals and held at 260° C. for 1.5 hours to complete the alcoholysis. The mixture was then cooled to 65° C. and 0.05 gram of dibutyltin dilaurate (0.02–0.03 percent of reactants) were added, followed by the incorporation of 38 grams of toluene diisocyanate (0.437 mole isocyanate) over a half-hour period. The urethane reaction temperature was held at 75° C. for 3 hours and at the end of this time 132 grams of toluene were added along with 1 percent filter-aid. After pressure filtration the coating vehicle had an initial Gardner-Holdt viscosity of C+ (90 cps.) which increased to G (165 cps.) over a 1-month period. The vehicle had an NVM of 65 percent, contained 75 percent linseed oil based on the solids and had a hydroxyl to isocyanate ratio of 1.08 to 1.

*Example V*

In an apparatus similar to that described in Example I, 195 grams of linseed oil (alkaline refined), 0.2 gram of lithium carbonate and 0.4 gram of anthraquinone were heated to 270° C. while stirring under an atmosphere of nitrogen. Twenty-four grams (0.495 mole hydroxyls) of methyl glucoside were added to the linseed oil in four equal portions at 10-minute intervals making sure the temperature did not fall below 260° C. The reaction mixture was held at 260° C. for 1.5 hours, then cooled down to 65° C. and 0.1 gram of dibutyltin dilaurate 0.03–0.04 percent based on weight of reactants) was added prior to the introduction of 41 grams (0.471 mole isocyanate) of toluene diisocyanate over a 5-minute period. Forty grams of toluene were added and the urethane reaction was held at 85° C. for 4 hours. The product was then cooled, 1 percent filter-aid and 100 grams of toluene were added with stirring prior to pressure filtration. The initial Gardner-Holdt viscosity was I (225 cps.) which increased to L (300 cps. over a period of 2 months.) This coating vehicle contains 65 percent NVM of which 75 percent was linseed oil. The hydroxyl to isocyanate ratio was 1.05 to 1 (5 percent excess hydroxyls).

*Example VI*

In an apparatus similar to that described in Example I, 154 grams of linseed oil (alkali refined) and 0.15 gram of lithium carbonate were heated to 270° C. with stirring under a nitrogen atmosphere. Over a period of one-half an hour, 24.4 grams (0.502 mole hydroxyls) of methyl glucoside were added in four equal portions at 10-minute intervals with the temperature not dropping below 260° C. The reaction mixture was held at 260° C. for 1.5 hours to complete the alcoholysis and then it was cooled down to about 55° C. and 0.075 gram of dibutyltin dilaurate (about 0.03 percent based on total solids) was added as the urethane catalyst. Over a period of one-half an hour 39.8 grams of toluene diisocyanate (0.457 mole isocyanate) were added to the alcoholysis product and held at a temperature of 95° C. for 2 hours. At the end of this time 180 grams of toluene and 1 percent filter-aid were added with agitation and the solution filtered under nitrogen pressure. The resulting product contained 55 percent NVM of which the linseed oil content was 70 percent. The hydroxyl to isocyanate ratio employed was 1.1 to 1 (10 percent excess hydroxyls). The initial Gardner-Holdt viscosity was D (100 cps.), which did not change on storage for 1 year.

*Example VII*

In an apparatus similar to that described in Example I, 195 grams of linseed oil (alkali refined), 0.2 gram of lithium carbonate and 0.4 gram of anthraquinone were heated to 270° C. while stirring and sparging with nitrogen. Twenty-four grams of methyl glucoside were added in four equal parts at 10-minute intervals and held at 260° C. for two hours. The mixture was then cooled to 70° C. and 50 grams of toluene and 0.1 gram of dibutyltin dilaurate were added, followed by the incorporation of 41 grams of TDI over a half-hour period. The urethane reaction temperature was then increased to 105° C. and held there for two hours and at the end of this time 163 grams of toluene were added along with two percent filter-aid. After pressure filtration under nitrogen the finished product contained 55 percent NVM of which the linseed oil content was 75 percent and it had a Gardner-Holdt viscosity of C (85 cps.) which did not change on storage.

*Example VIII*

In an apparatus similar to that described in Example I, 195 grams of linseed oil (alkali refined), 0.2 gram of lithium carbonate and 0.4 gram of anthraquinone were rapidly heated to 270° C. while stirring under a nitrogen sparge. Twenty-four grams of methyl glucoside were added in four equal portions at 10-minute intervals making sure the temperature did not fall below 260° C. The mixture was held at about 260° C. for two hours and then cooled to 70° C. where 50 grams of toluene and 0.1 gram of dibutyltin dilaurate (0.03 percent of charge) were added, followed by the incorporation of 41 grams of toluene diisocyanate (TDI) over a half-hour period. During the addition of the TDI, the temperature was not allowed to climb over 60° C. but immediately upon completion of the addition, the temperature was increased to 100° C. and held there for two hours. The vehicle was then cooled to about 60° C. where 163 grams of toluene and about two percent of filter-aid were added with stirring. The product was then filtered under nitrogen using a pressure filter. The finished vehicle contained 55 percent nonvolatile material (NVM) of which the linseed oil content was 75 percent. It had a Gardner-Holdt viscosity of B (65 cps.) which did not change on storage.

*Example IX*

In an apparatus similar to that described in Example I, 195 grams of linseed oil (alkali refined), 0.2 gram of lithium carbonate and 0.4 gram of anthraquinone were rapidly heated to 270° C. while stirring under a nitrogen sparge. Twenty-four grams of methyl glucoside were added in four equal portions at 10-minute intervals making sure the temperature did not fall below 260° C. The mixture was held at about 260° C. for two hours and then cooled to 50° C. where 40 grams of toluene and 0.1 gram of dibutyltin dilaurate were added, followed by the incorporation of 41 grams of TDI over a half-hour period. During the addition of the TDI the temperature was not allowed to increase above 60° C. but immediately upon completion of the addition the temperature was increased to 95° C. and held there for one-half an hour. At this time it was necessary to add 50 grams of toluene in order to cut down the build-up of viscosity in the vehicle. The 95° C. was regained and held there for another one and one-half hours after which time the vehicle was cooled to about 60° C. and 123 grams of toluene along with about two percent filter-aid were added with stirring. The product was then filtered under nitrogen pressure. The finished vehicle contained 55 percent of NVM of which the linseed oil content was 75 percent and it had a Gardner-Holdt viscosity of B (65 cps.) which did not change on storage.

Example X

In an apparatus similar to that described in Example I, 195 grams of linseed oil (alkali refined), 0.2 gram of lithium carbonate and 0.4 gram of anthraquinone were heated to 270° C. while stirring and sparging with nitrogen. Twenty-four grams of methyl glucoside were added in four equal portions at 10-minute intervals and held at 260° C. for two hours. The mixture was then cooled to 50° C. and 68 grams of toluene and 0.1 gram of dibutyltin dilaurate were added, followed by the incorporation of 41 grams of TDI over a half-hour period. The urethane reaction temperature was then held at 90° C. for two hours and at the end of this time 145 grams of toluene were added along with two percent filter-aid. After pressure filtration under nitrogen, the finished vehicle contained 55 percent NVM of which the linseed oil content was 75 percent and it had a Gardner-Holdt viscosity of B (65 cps.) which did not change on storage.

Example XI

In an apparatus similar to that described in Example I, 195 grams of linseed oil (alkali refined), 0.2 gram of lithium carbonate and 0.4 gram of anthraquinone were heated to 270° C. while stirring under an atmosphere of nitrogen. Twenty-four grams of methyl glucoside were added to the linseed oil in four equal portions at 10-minute intervals making sure the temperature did not fall below 260° C. The reaction mixture was held at 260° C. for two hours and then cooled down to 70° C. where 0.1 gram of dibutyltin dilaurate and 50 grams of toluene were added prior to the introduction of 41 grams of TDI over a half-hour period. The temperature was held below 60° C. while the TDI was being added and then was raised to 85° C. at which temperature the reaction was held for one-half an hour. At the end of this period the solution had increased in viscosity to such an extent that 50 grams of toluene had to be added so the vehicle would not gel. The reaction was then held at 85° C. for an additional one and one-half hours and then cooled to about 60° C. where 113 grams of toluene and about two percent filter-aid was added prior to pressure filtration. The finished vehicle contained 55 percent NVM of which 75 percent was linseed oil and it had an initial Gardner-Holdt viscosity of C (85 cps.) which increased to D (100 cps.) and has remained there since.

Example XII

In an apparatus similar to that described in Example I, 195 grams of linseed oil (alkali refined), 0.2 gram of lithium carbonate and 0.4 gram of anthraquinone were heated to 270° C. while stirring under a nitrogen sparge. Twenty-four grams of methyl glucoside were added to the linseed oil in four equal portions at 10-minute intervals making sure the temperature did not fall below 260° C. The reaction mixture was held at 260° C. for two hours and then cooled down to 70° C. where 0.05 gram of dibutyltin dilaurate (0.02 percent of charge) and 50 grams of toluene were added prior to the introduction of 41 grams of TDI over a period of a half-hour. After the TDI addition the temperature was increased to 90° C. and held there for one-half an hour at which time the viscosity had increased to such a point that gelation was imminent. Therefore 50 grams of toluene was added and the 90° C. temperature was regained and held there for an additional one and one-half hours. The product was then cooled to 60° C., 113 grams of toluene and about two percent filter-aid added prior to pressure filtration. The finished vehicle contained 55 percent NVM of which 75 percent was linseed oil and it had a Gardner-Holdt viscosity of C (85 cps.) which did not change on storage.

Example XIII

In an apparatus similar to that described in Example I, 195 grams of linseed oil (alkali refined), 0.2 gram of lithium carbonate and 0.4 gram of anthraquinone were rapidly heated to 270° C. while stirring under a nitrogen sparge. Twenty-four grams of methyl glucoside were added in four equal portions at 10-minute intervals making sure the temperature did not fall below 260° C. The mixture was held at about 260° C. for two hours and then cooled to 70° C. where 50 grams of toluene and 0.025 gram of dibutyltin dilaurate (0.01 percent of charge) were added, followed by the incorporation of 41 grams of TDI over a half-hour period. During the addition of the TDI, the temperature was not allowed to climb above 60° C. but immediately upon completion of the addition, the temperature was increased to 90° C. and held there for one-half an hour. At this time 50 grams of toluene had to be added due to fear of gelation. It was then held at 90° C. for an additional one and one-half hours and was then cooled to 60° C. where 113 grams of toluene and two percent filter-aid were added with stirring. The product was then filtered using a pressure filter. The finished vehicle contained 55 percent NVM of which the linseed oil content was 75 percent. It had a Gardner-Holdt viscosity of C (85 cps.) which did not change on storage.

Example XIV

In an apparatus similar to that described in Example I, 195 grams of linseed oil (alkali refined), 0.2 gram of lithium carbonate and 0.4 gram of anthraquinone were heated to 270° C. while stirring and sparging with nitrogen. Twenty-four grams of methyl glucoside were added in four equal parts at 10-minute intervals and held at 260° C. for two hours. The mixture was then cooled to 70° C. and 50 grams of toluene were added, followed by the incorporation of 41 grams of TDI over a half-hour period. The temperature was then increased to 95° C. and held there for one hour, at which time it was necessary to add 50 grams of toluene due to possible gelation. The product was held an additional hour at 95° C. and then cooled down to 60° C. where 113 grams of toluene and two percent filter-aid were added prior to pressure filtration. The finished vehicle contained 55 percent NVM of which the linseed oil content was 75 percent and it had an initial Gardner-Holdt viscosity of C (85 cps.) and over a period of three weeks increased to F (140 cps.).

Example XV

In an apparatus similar to that described in Example I, 195 grams of linseed oil (alkali refined), 0.2 gram of lithium carbonate and 0.4 gram of anthraquinone were rapidly heated to 270° C. while stirring under a nitrogen sparge. Twenty-four grams of methyl glucoside were added to the linseed oil in four equal portions at 10-minute intervals making sure the temperature did not fall below 260° C. The reaction mixture was held at 260° C. for two hours and then cooled down to 50° C. where 60 grams of toluene were added and the incorporation of 41 grams of TDI begun. The TDI was added over one-half hour and the temperature increased to 110° C. and held there for a half-hour at which time it was necessary to add 50 grams of toluene due to viscosity build-up. The reaction was held at 110° C. for an additional one and one-half hours, then cooled to 60° C. where 103 grams of toluene and about two percent filter-aid were added prior to pressure filtration. The finished vehicle contained 55 percent NVM of which the linseed oil content was 75 percent. The initial Gardner-Holdt viscosity was C (85 cps.) which increased over a period of one week to E (125 cps.) and then held that viscosity on storage.

Example XVI

In an apparatus similar to that described in Example I, 195 grams of linseed oil (alkali refined), 0.2 gram of lithium carbonate and 0.4 gram of anthraquinone were heated to 270° C. while stirring under a nitrogen sparge. Twenty-four grams of methyl glucoside were added in four equal portions at 10-minute intervals and held at 260° C. for two hours. The mixture was then cooled to 70° C., 50 grams of toluene were added and 41 grams of TDI were added over a half-hour period. The temperature was increased to 130° C. and held for two hours. The vehicle was then cooled to about 60° C. and 173 grams of toluene were added along with about two percent filter-aid. After pressure filtration under nitrogen, the finished vehicle contained 54 percent NVM of which the linseed oil content was 75 percent and it had a Gardner-Holdt viscosity of B (65 cps.) which did not change on storage.

*Example XVII*

In an apparatus similar to that described in Example I, 195 grams of safflower oil (alkali refined), 0.2 gram of lithium carbonate and 0.4 gram of anthraquinone were heated to 270° C. while stirring under a nitrogen sparge. Twenty-four grams of methyl glucoside were added in four equal parts at 10-minute intervals and held at 260° C. for two hours. The mixture was then cooled to 70° C. and 213 grams of toluene and 0.1 grams of dibutyltin dilaurate were added, followed by the incorporation of 41 grams of TDI over a half-hour period. The urethane reaction temperature was then increased to 95° C. and held there for two hours and at the end of this time about four grams of filter-aid were added and the vehicle pressure filtered under nitrogen. The finished product contained 55 percent NVM of which the safflower oil content was 75 percent and it had a Gardner-Holdt viscosity of A-2 (22 cps.) which did not change on storage.

*Example XVIII*

In an apparatus similar to that described in Example I, 195 grams of soybean oil (alkali refined), 0.2 gram of lithium carbonate and 0.4 gram of anthraquinone were heated to 270° C. while stirring and sparging with nitrogen. Twenty-four grams of methyl glucoside were added in four equal parts at 10-minute intervals and held at 260° C. for two hours. The mixture was then cooled to 70° C. and 140 grams of toluene and 0.1 gram of dibutyltin dilaurate were added followed by incorporation of 41 grams of TDI over a half-hour period. The temperature was increased to 95° C. and held there for two hours and then cooled down, at which time four grams of filter-aid were added and the vehicle was pressure filtered under nitrogen. The finished vehicle contained 65 percent NVM of which the soybean oil content was 75 percent and the Gardner-Holdt viscosity held at a constant F (140 cps.).

I claim:
1. The process of preparing an oil-modified urethane coating composition stabilized against viscosity increase which comprises reacting a drying oil triglyceride with methyl glucoside, and reacting the resultant product with toluene diisocyanate in the presence of a dibutyltin dilaurate catalyst at a temperature above about 90° C. to 130° C.

2. The process of claim 1 in which the drying oil triglyceride is linseed oil.

3. The process of claim 1 in which the drying oil triglyceride is safflower oil.

4. The process of claim 1 in which the drying oil triglyceride is soybean oil.

5. The process of preparing an oil-modified urethane coating composition stabilized against viscosity increase which comprises reacting a drying oil triglyceride with methyl glucoside, and reacting the resultant product with toluene diisocyanate at a temperature of about 130° C.

References Cited by the Examiner

UNITED STATES PATENTS

| | | | |
|---|---|---|---|
| 2,715,111 | 8/1955 | Weinberg | 260—873 |
| 2,926,148 | 2/1960 | Leclercq et al. | 260—18 |
| 2,936,295 | 5/1960 | Orth | 260—9 |
| 2,970,062 | 1/1961 | Hauge et al. | 160—123 |
| 2,970,123 | 1/1961 | Rhodes et al. | 260—22 |
| 3,022,326 | 2/1962 | Schroeder et al. | 260—404.5 |
| 3,022,327 | 2/1962 | Waythomas | 260—404.5 |
| 3,039,976 | 6/1962 | Barnes et al. | 260—18 |
| 3,073,788 | 1/1963 | Hostettler et al. | 260—210 |
| 3,075,926 | 1/1963 | Stewart et al. | 260—2.5 |
| 3,075,927 | 1/1963 | Lanham | 260—18 |
| 3,084,177 | 3/1963 | Hostettler et al. | 260—404.5 |
| 3,224,988 | 12/1965 | Skreckoski | 260—22 |

OTHER REFERENCES

"Reactions of Isocyanates With Drying Oils," Industrial and Engineering Chemistry, vol. 51, No. 11, 1959, p. 1385.

Technical Bulletin TS-4R, date of publication, National Aniline Div., Allied Chemical Corp. (1961), p. 15.

LEON J. BERCOVITZ, *Primary Examiner.*

WARREN C. IVY, *Assistant Examiner.*